United States Patent

[11] 3,572,666

| [72] | Inventor | Pier N. Fehr<br>Milan, Italy |
|---|---|---|
| [21] | Appl. No. | 821,169 |
| [22] | Filed | Apr. 29, 1969 |
| [45] | Patented | Mar. 30, 1971 |
| [73] | Assignee | S. A. Heurtey<br>Paris, France |
| [32] | Priority | May 8, 1968 |
| [33] | | France |
| [31] | | PV150963 |

[54] SAND SEAL
11 Claims, 15 Drawing Figs.

[52] U.S. Cl. .................................................. 263/47,
263/40, 266/5, 277/135, 34/242
[51] Int. Cl. ........................................................ F27b 3/02,
F27d 7/00
[50] Field of Search ........................................ 277/9, 135,
53, 237, 16; 266/5 (B), 5 (C); 263/47 (A), 40;
34/242

[56] References Cited
UNITED STATES PATENTS

| 2,419,079 | 4/1947 | Jaxtheimer.................... | 277/53 |
| 2,429,481 | 10/1947 | Mohr, Jr. et al. .............. | 277/16 |
| 2,985,551 | 5/1961 | Todd............................. | 266/5 |
| 3,053,523 | 9/1962 | Shipley.......................... | 266/5 |
| 3,179,394 | 4/1965 | Sims et al...................... | 266/5X |

*Primary Examiner*—Samuel G. Rothberg
*Attorney*—Bosworth, Sessions, Herrstrom & Cain

ABSTRACT: A seal for providing a substantially gastight connection between separable elements of a structure, such as a furnace base and a charge-enclosing bell or cover supported thereon, comprising a trough formed in one of said elements, a body of granular material such as sand in said trough, a fin or apron on the other of said elements and adapted to extend into said trough when the elements are assembled, and means for fluidizing the body of granular material in the trough while the apron is being inserted thereinto and, if desired, while it is being removed therefrom.

Patented March 30, 1971 3,572,666

INVENTOR.
PIER N. FEHR

BY Bosworth, Sessions
Herstrom & Cain
ATTORNEYS

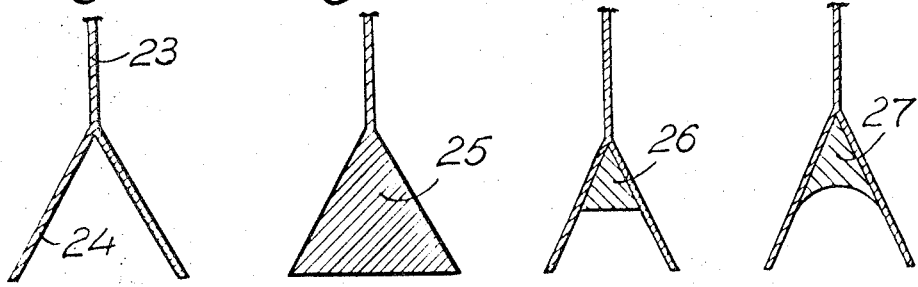
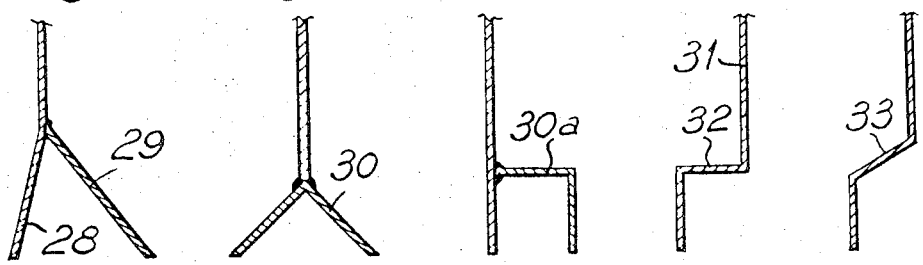
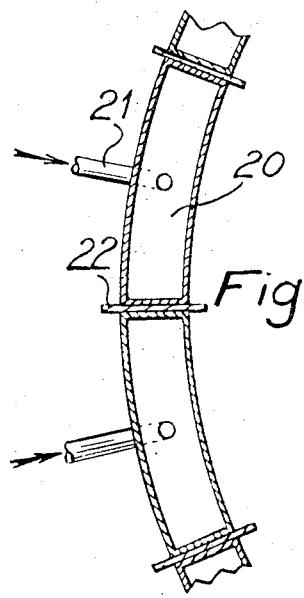
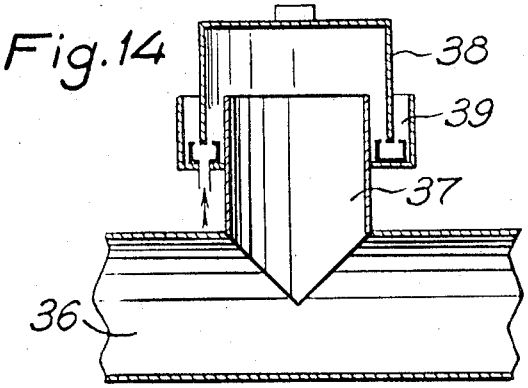
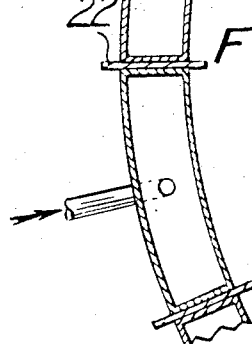
INVENTOR.
PIER N. FEHR 3,572,666

SAND SEAL

BACKGROUND OF THE INVENTION

In the metallurgical industry it is frequently necessary to apply heat treatment under controlled atmospheric conditions and this requires the use of enclosures that are openable and consequently must be furnished with a closing device providing a tight seal with the wall of the chamber.

One of the means most frequently used in cases where a seal of this type is exposed to high temperatures is the sand seal. Generally, this consists of a trough filled with sand or similar granular material, this trough being located at the edge of an opening on one of the walls of the enclosure and into which a fin or apron, attached to another of the elements of the wall such as a closing device or hood, penetrates into the sand to a certain depth and insures the tightness of the seal. This type of seal can be modified, in the presence of lower operating temperatures and with the benefit of increased tightness, by using the same general structure but with a liquid in place of the granular material.

Sand seals have certain disadvantages, mainly due to the considerable resistance to penetration by the fin or apron into the sand-filled trough, and also owing to unevenness of the sand level in the trough and consequently the risk of insufficient tightness if by chance the level of the sand should be below the apron rim. This invention relates primarily to overcoming difficulties such as these.

SUMMARY OF THE INVENTION

With this objective, the invention provides an improvement in this type of seal whereby the seal is made with flowable granular material in the form of a fluid bed acting as a sealant upon penetration of the sealing fin or apron into the bed of granular material. Such fluid conditions of the sand bed allow the sealing apron to penetrate with ease and insure that each time the material becomes flowable the sand level will be equalized so that it is the same at all points in the trough, whether or not the apron is present.

Furthermore, the flowability of the sand bed allows for more complex shaped aprons, thus achieving greater tightness of the seal than that obtainable with the simple rectilinear fin forms commonly used with prior nonflowable sand seals. In the present method flowability of the sand is achieved by placing on the trough bottom certain elements which release gas from the inner side.

Another method of obtaining the same results is to provide the apron or fin itself with nozzles or other suitable gas outlets to insure the progressive flowability during the penetration of the apron or, if necessary, during its retraction.

In every case, in order to avoid pollution or contamination of the atmosphere in a chamber, it is advisable to use for flowability purposes either the furnace atmospheric gas itself or a gas of an inert nature. For the purposes of the metallurgical industry nitrogen is probably the most applicable; in any case the gas should preferably be in dry form.

BRIEF DESCRIPTION OF THE DRAWINGS

Although in no way limiting its use, certain embodiments of the invention are illustrated in the accompanying drawings in which:

FIGS. 4 to 12 show in cross section various additional designs for the edge of a sealing apron adapted to penetrate a bed of flowable sand contained in a trough.

FIG. 13 is a fragmentary elevational view of an apron having a notched or serrated bottom edge.

FIG. 14 shows the diagram of a section of an opening connecting with the outside atmosphere, its closing device and the corresponding tight seal.

FIG. 15 shows a diagram of the distribution of the boxes supplying the fluidizing product.

DESCRIPTION OF THE ILLUSTRATED EMBODIMENTS

Figure 1:
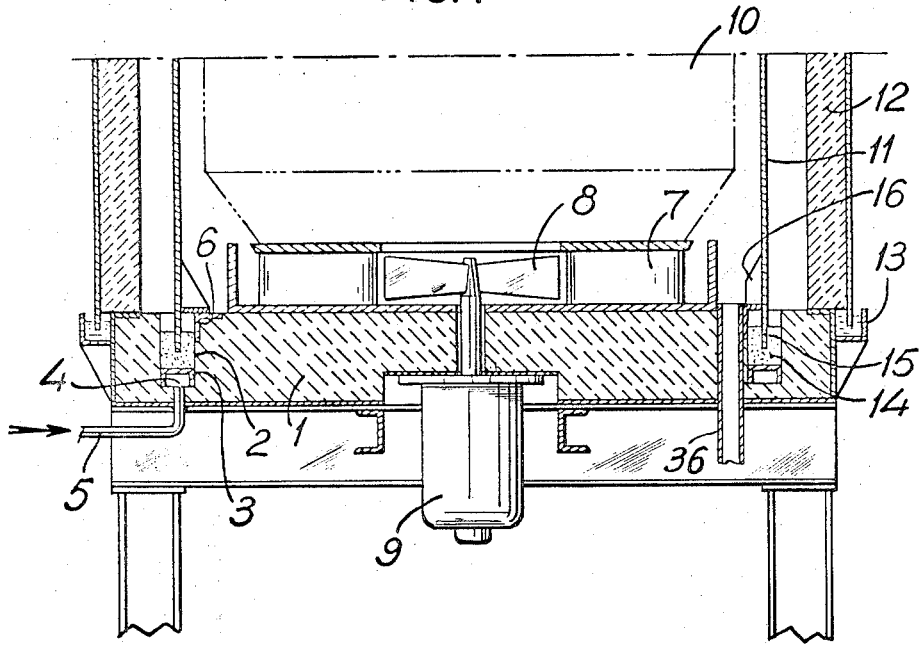
FIG. 1 is a vertical cross-sectional view illustrating the lower portion of a furnace for heat treating coils of strip steel, one embodiment of the seal of the present invention being incorporated therein.

In the embodiment illustrated in FIG. 1 a hooded furnace 12 has a base 1 whose periphery has a trough 2. The lower part of this trough contains a porous support 3, such as a perforated or slotted inverted metal channel member, through which gas may pass but which will support the sand 14 in the trough 2. Under the porous support 3 is a feedbox 4 into which a fluidizing gas is introduced by a feed pipe 5 from any suitable source of the desired gas under adequate pressure. The gas should preferably be dry. The inner edge of trough 2 has a reinforced support 6. The base 1 has a charge support 7 in the center of which is the impeller 8 of a fan or blower driven by a motor 9 with its shaft passing through the base 1. The charge support 7 is adapted to support a stack of coils 10 of metal strip.

The base 1 also has, for the purpose of enclosing the charge of coils 10, a protective inner cover in the shape of a bell which in turn is covered by a bell-type furnace 12 removably supported on the outer periphery of the base 1.

When the trough 2 is filled with sand 14 the seal thus formed can be exposed to the high temperature existing under the cover 11. The outer edge of the bell furnace 12 is provided with a simple external hydraulic seal 13 which is satisfactory as it will be subjected only to temperatures scarcely higher than the circumambient.

It will be noted that the sand load 14 in trough 2 is penetrated by a fin or apron 15 which extends from cover 11 downwardly beyond the support flanges 16 which, together with support 6, limit the penetration of the sand 14 by the apron 15 of the inner cover 11. The support flanges 16 can, if desired, be substituted by a continuous annular member.

The operation of the described apparatus is as follows: Simultaneously with the positioning of inner cover 11 on the base 1 a fluidizing gas is discharged through the feed pipe 5 to the body of sand 14. The effect of this is to transform the sand into a flowable mass which assumes a constant level inside the trough 2 and admits the easy penetration of apron 15. Once this penetration is produced and contact made between the flanges 16 and support 6, the fluidizing gas supply is shut off. In like manner the sand may be fluidized so that the cover 11 can be lifted with difficulty. As noted above, the flowability of the sand has the effect of providing a uniform sand level in addition to providing easy penetration of the apron without unfavorable settling or compacting of the sand.

Figure 2:
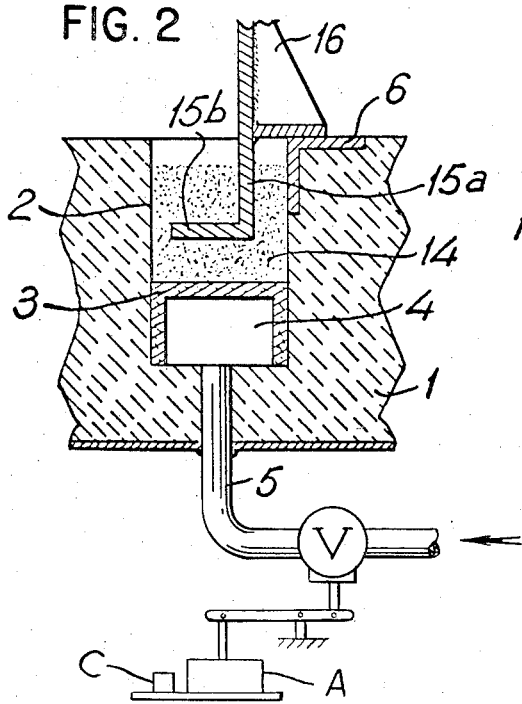
FIG. 2 shows a variation of the sand seal of FIG. 1 on a somewhat larger scale.

As shown in FIG. 2, the flowability of the sand allows apron 15a to be given an angular shape as indicated at 15b, thus prolonging the line of possible leakage within the sand and providing a tighter seal.

Figure 3:
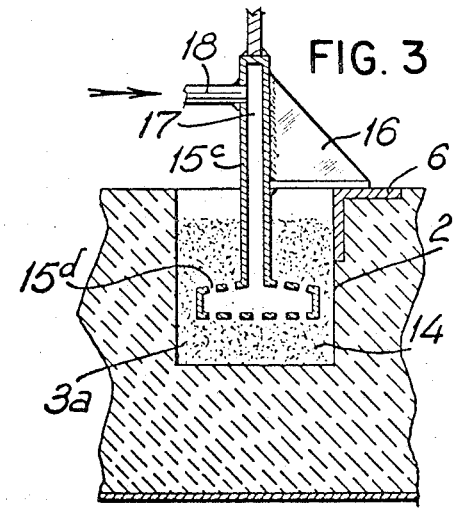
FIG. 3 shows another variation of the seal of FIG. 1 in which the fluidizing gas is discharged through the apron member of the seal.

Flowability of the body of sealing sand 14 can also be obtained by means of nozzles located on the rim of the apron of the inner cover 11 as seen in FIG. 3. The apron 15c which extends into the trough 3a has nonporous spaced walls forming a duct 17 which extends to the perforated head portion 15d. Duct 17 is connected to a source of fluidizing gas by pipe 18. In this way flowability of the sand body in the furnace is achieved at the time of penetration of the head 15d within the sand or similar granular material. Although the gas outlets could be positioned at the bottom and on the sides of a simple, straight apron, a more desirable arrangement is deemed to be on the top and bottom of an angular head 15d which supports the weight of the cover 11 and hinders its penetration into the sand as soon as flowability stops when the gas is shut off. In place of a continuous perforate or porous sand support 3 as seen in FIG. 1 a series of gas outlets extending into the trough 2 may be employed.

As regards the granular material, it is advantageous to use corundum grains but the preferred material is a natural zirconium sand found in Australia. The fineness of the grains is approximately 0.1 mm. and both the larger size grains and finer sizes in the form of powder should be excluded. Material such as this affords a relatively high volume mass which is a desireable feature.

As shown in FIG. 15, the sand trough can be made up of independent regularly spaced boxes 20, each of which is fed in parallel from a source (not shown) of fluidizing gas by means of the pipes 21, preferably all of similar size. The boxes 20 have pervious upper sand-supporting surfaces like the porous support 3 of FIG. 1. Such pervious surfaces may have regularly distributed holes or slits the size of which should preferably be approximately 5/100 to 1/10 mm. in order to prevent the granular material from passing therethrough.

Each box 20 may if desired be separated from the contiguous box by a spacer 22 forming a rib that prevents the engagement of the bottom edge of the apron with the porous top walls of the boxes. The spacer ribs 20 extend above the porous surfaces of boxes 20 and serve to prevent attrition caused by the apron. The boxes 20 in the usual coil-annealing furnace can be, for example, 3 feet or more in length.

The outflow of the fluidizing gas provides flowability to the granular sealing material according to the rate at which the gas is fed, ranging from slight to turbulent, the former being preferred.

There is an advantage in providing a repeat-type feed of the fluidizing gas to the seal by intermittently turning the gas on and off as by a quick-acting valve V (FIG. 2) in the gas feed line 5 operated manually, pneumatically, electrically or hydraulically by an actuation A controlled either through a pushbutton device or a suitable repeating mechanism C of any well-known type. Intermittent flowability is thus achieved at the precise moment when penetration of the apron into the sand occurs. This will produce a relatively slow lowering speed of the hood and apron caused by the successive flowable and nonflowable condition of the granular material. This procedure reduces the consumption of fluid required for the seal, eliminates the adverse effects of hood offcenter positioning or slanting of the hood, and greatly diminishes the risk of accidental spurts of granular material from the trough.

The seal between a sand-filled trough and the lower edge of an apron or the like can be improved by using an elongate or extended apron edge design.

As shown in FIGS. 4 to 13, the contact surface of the apron may be increased in several different ways. The apron rim 23 (FIG. 4) can be furnished with a dihedron shaped edge, recessed as seen at 24 in FIG. 4, with a complete filling 25 (FIG. 5), or a partial filling the latter being shown at 26 with a flat bottom surface in FIG. 6 and with a curved bottom surface at 27 in FIG. 7.

The angle of the faces of the dihedron can consist of one side 28 (FIG. 8) at a greater slant than the other portion 29. Whether symmetrical in shape or not, such a dihedron can be formed in the manner explained, and particularly as shown in FIG. 9 by using an angle iron 30 welded to the bottom edge of the apron. In the example shown in FIG. 10, the angle iron 30a is joined at one of its angles to the apron face.

It is also possible to have a step-shape bottom edge 32 of the apron 31 as seen in FIG. 11. When this arrangement is used it is advisable to give the apron a conical crown 33 (FIG. 12) which will absorb expansion and contraction caused by sudden and considerable temperature changes.

As seen in FIG. 13, the apron may also, if desired, be formed with a notched bottom edge, the downwardly projecting areas 35 of which are equal or unequal in width and uniformly or nonuniformly spaced apart.

All the above-described developments increase the efficiency of an apron in a hooded furnace, particularly in regard to its positioning and penetration.

If at the start of a furnace operation an inner cover 11 is lowered quickly into position on the furnace base as seen in FIG. 1 the atmosphere within the cover may be compressed and the resulting increase in pressure applied against the sand in the trough 3 may cause some of it to blow or spurt out of the trough. This is undesirable. Furthermore, when the inner cover is removed, particularly if done rapidly, the pressure under the cover may be reduced to such a degree as to cause and to spurt up out of the trough. This may be prevented in either case by providing a rather large pipe 36 (FIGS. 1 and 14) extending into the furnace chamber within the cover 11 and closed from the atmosphere at its outer end. This pipe, a section of which is seen in FIG. 14, has an upwardly extending portion 37 around which an open topped trough 39 is formed. A bell-shaped valve or closure member 38 is removably positioned in the trough 39 and may conveniently be provided at its bottom edge with a flowable sand seal of the type herein described.

To prevent spurting of sand from the main furnace seal during installation or removal of the cover 11 the closure member 38 is removed, thus connecting the interior of the furnace cover 11 to the outside atmosphere through pipe 36. The size of this pipe is sufficient so that the downward or upward movement of the cover 11 with not cause an increase or decrease in the pressure within the cover sufficient to move the sand in the trough 2 and thus any tendency for the sand to spurt out will be eliminated.

It is to be noted that the applications of this type of flowable sand seal are not limited to hooded or bell-type furnaces for heat treating coils of strip steel, but that it is also applicable to all structures and processes where a sand seal is required, in the metallurgical and other industries. The fluid seal also avoids wear and tear on the aprons or similar devices and, at the same time, prevents reduction in the grain size of the sand or other granular material used since it is not subject to crushing or attrition.

While the foregoing describes certain embodiments, it will be understood that the invention may also be practiced in other forms within the descriptions of the following claims.

I claim:

1. A seal for forming a connection between separate elements of a structure including, a trough formed in one of said elements, a body of granular material in said trough, an apron on the other of said elements adapted to extend into said body of granular material in said trough when said elements are assembled, and means for discharging fluidizing gas into substantially the entire body of granular material in said trough while said apron is being inserted thereinto.

2. A seal as defined in claim 1 in which the trough and apron are circular, a pervious member is disposed in the trough and adapted to be covered by said granular material, and means are provided for directing fluidizing gas into said trough below said pervious member.

3. A seal as defined in claim 1 in which the apron is a vertically extending fin depending from said other element.

4. A seal as defined in claim 3 in which said apron includes a laterally extending portion whereby its contact area with the granular material is enlarged.

5. A seal as defined in claim 1 in which said apron is provided with gas-conducting means and has its lower portion provided with gas outlet openings to permit the flow of fluidizing gas therefrom, and means for conducting fluidizing gas into said gas conducting means.

6. A seal as defined in claim 1 including means for controlling said means for discharging fluidizing gas whereby the body of granular material is intermittently and repeatedly rendered fluid and nonfluid.

7. A seal as defined in claim 1 in which said trough is divided into a series of separate boxes each having a porous sand-supporting top wall, and means are provided for feeding fluidizing gas to each of said boxes below said porous top wall.

8. A seal as defined in claim 7 including spacers between said boxes and extending above said porous top walls thereof whereby said apron will engage said spacers and be held away from the porous top walls of said boxes.

9. A seal as defined in claim 1 in which the lower edge of said apron has a notched form.

10. A seal as defined in claim 4 in which the laterally extending portion of said apron is in the form of a dihedron of inverted Vishape.

11. A seal as defined in claim 1 in which one of said separate elements comprises a housing adapted to form an atmosphere enclosing chamber when in position with the other element, at atmosphere conducting connection from said chamber to the outside atmosphere, and valve means for opening and closing said atmosphere connection.